UNITED STATES PATENT OFFICE.

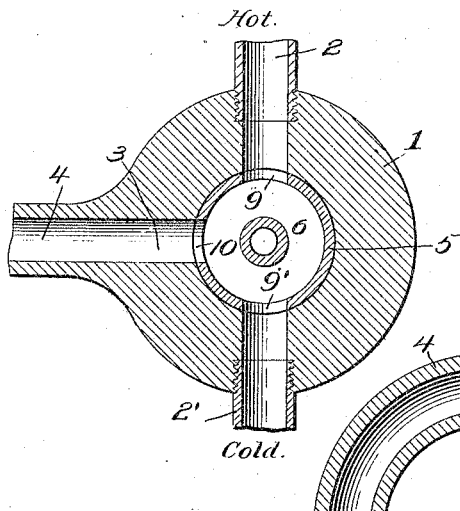
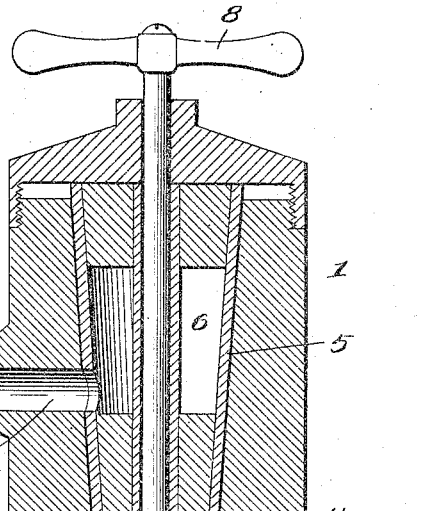
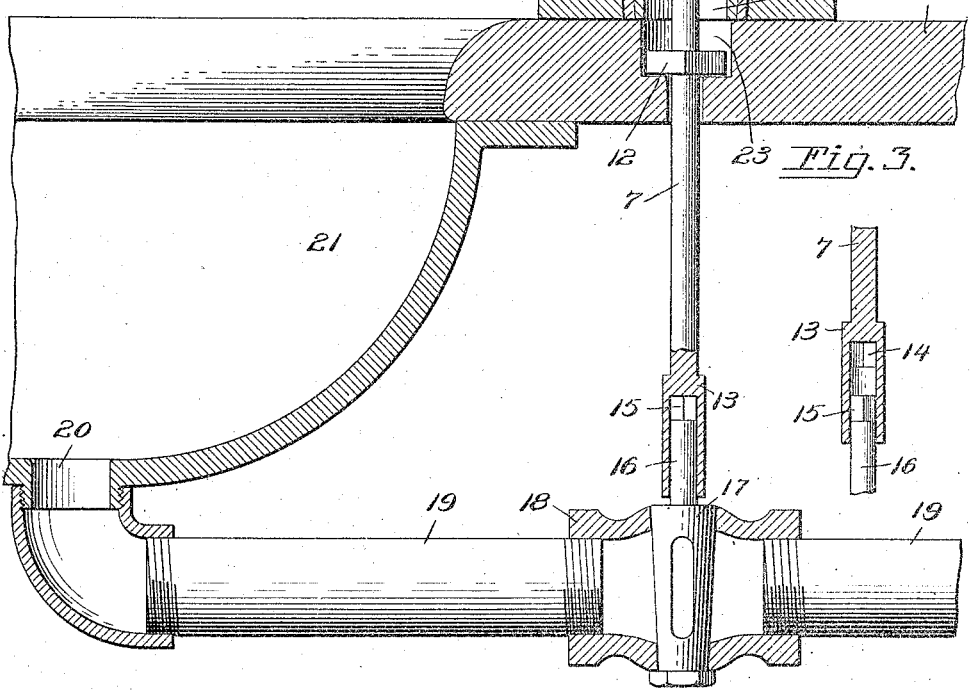

CHARLES A. PRIDE, OF TOMPKINSVILLE, NEW YORK.

FAUCET.

No. 916,591.  Specification of Letters Patent.  Patented March 30, 1909.

Application filed October 30, 1907. Serial No. 399,920.

*To all whom it may concern:*

Be it known that I, CHARLES A. PRIDE, a citizen of the United States, residing at Tompkinsville, in the county of Richmond, and State of New York, have invented new and useful Improvements in Faucets, of which the following is a specification.

This invention relates to faucets, the object of the invention being to provide a combined faucet and drain valve both of which are operable independently by a common actuating device, the device as a whole being especially designed for use in connection with bath and foot tubs, wash tubs, basins, sinks and the like.

With the above and other objects in view, the nature of which will more fully appear as the description proceeds, the invention consists in the novel construction, combination and arrangement of parts hereinafter fully described, illustrated and claimed.

In the accompanying drawing, Figure 1 is a sectional elevation of the faucet and drain valve complete showing the supply valve open and the drain valve closed. Fig. 2 is a horizontal section through the supply valve or faucet proper taken in line with the inlet and outlet ports and nozzle. Fig. 3 is a detail vertical section showing the relation between the stem of the faucet and the stem of the drain valve.

The faucet comprises essentially a faucet body 1 having hot and cold water inlets 2 and 2' and an outlet 3 which communicates with the nozzle 4. Within the faucet body 1 is mounted a hollow taper valve 5 having a central tube 6, the bore of which is of sufficient size to slidably receive an operating stem 7 to which is connected a suitable handle 8. The valve 5 is provided with hot and cold water inlets 9 and 9' and with an outlet port 10 respectively adapted to register with the corresponding inlets and outlet of the faucet body, as shown in Fig. 1. By turning the valve, however, the said valve ports are thrown out of line with the corresponding ports in the faucet body thus cutting off the supply of water.

In order to turn the valve 5, the valve is provided at its lower end with a squared socket 11 of a shape corresponding to and adapted to receive a valve operating shoulder 12 on the slidable stem 7, so that by raising the handle 8 and elevating the stem 7, the shoulder 12 is caused to enter the socket 11 and engage the faucet valve so as to turn the same either to a closed or open position.

The lower end of the stem 7 is provided with a socket wrench 13 having a squared or shouldered inner end as shown at 14 to fit over and engage the correspondingly squared extremity 15 of the stem 16 of a drain valve 17, the stem 16 with the exception of the squared portion 15 being round or cylindrical so as to allow the lower end portion of the socket wrench 13 to turn thereon without imparting any movement to the drain valve 17, as indicated in Fig. 3. The valve 17 is mounted in the valve casing 18 interposed at a point in the waste pipe 19 which communicates with the waste outlet 20 of a tub, sink or basin indicated at 21. Where the room will permit, the top facing 22 of the tub or sink is provided with a recess 23 in which the shoulder 12 of the stem 7 is received when said stem is lowered.

The parts above described are so constructed and relatively disposed that when the stem 7 is slid upward, the shoulder 12 will engage the faucet valve after which by turning said stem by means of the handle 8, the faucet may be opened or closed. By sliding the stem 7 downward, the squared inner end 14 of the socket wrench will engage the squared extremity 15 of the stem of the drain valve after which by turning the stem 7 by means of the handle 8 the drain valve 17 may be opened or closed as the case may be. Thus, a single operating device controls both the water supply and the waste pipe, and admits either hot or cold water to the nozzle or both hot and cold water at the same time, as may be desired.

Having thus fully described the invention, what is claimed as new is:—

1. The combination with a supply valve and a waste valve, of a valve stem common to both valves and adapted to independently engage and disengage said valves to open and close the same independently of each other, substantially as described.

2. The combination with a supply valve and a waste valve, of a stem having a sliding relation to the supply valve and a shoulder adapted to move into and out of engagement with said valve for turning the same, and also provided with a part adapted to be moved into and out of engagement with the waste valve for actuating the latter independently of the supply valve.

3. The combination with a supply valve and a drain valve, of an operating stem provided with a handle and passing through the supply valve, a shoulder on said stem adapted to be moved into and out of engagement with the supply valve and another shoulder on said stem adapted to be moved into and out of engagement with the drain valve.

4. The combination with a supply valve and a waste valve, of a stem bearing a fixed relation to the waste valve, and an operating stem bearing a sliding relation to the supply valve and provided with shoulders movable into and out of engagement with the supply valve and the stem of the waste valve, said shoulders being so disposed relatively to the two valves that either of said valves may be opened or closed independently of the other by the operation of said sliding stem.

5. The combination with a supply valve and an underlying waste valve provided with an upstanding stem fixed thereto and provided with a squared portion, of a stem bearing a sliding relation to the supply valve and provided with a squared shoulder movable into and out of a socket in the supply valve for turning said valve, said stem being further provided with a socket wrench fitting around the stem of the waste valve and adapted in one position to turn thereon and in another position to engage the squared portion of the waste valve stem and turn the latter, substantially as described.

In testimony whereof I affix my signature in presence of two witnesses.

CHARLES A. PRIDE.

Witnesses:
F. H. MOFFATT,
E. L. LEE.